United States Patent

Luginsland et al.

(10) Patent No.: US 6,727,339 B2
(45) Date of Patent: Apr. 27, 2004

(54) OLIGOMERIC ORGANOSILANES, PROCESS FOR THEIR PRODUCTION AND THEIR USE

(75) Inventors: Hans-Detlef Luginsland, Köln (DE); Andre Hasse, Linnich (DE); Michael Radcziwill, Brühl (DE); Roland Krafczyk, Rheinfelden (DE)

(73) Assignee: Degussa AG, Düsseldorf (DE)

( * ) Notice: Subject to any disclaimer, the term of this patent is extended or adjusted under 35 U.S.C. 154(b) by 1 day.

(21) Appl. No.: 10/188,035

(22) Filed: Jul. 3, 2002

(65) Prior Publication Data

US 2003/0109614 A1 Jun. 12, 2003

(30) Foreign Application Priority Data

Jul. 6, 2001 (DE) .......................... 101 32 941

(51) Int. Cl.[7] .............................. C08G 77/28
(52) U.S. Cl. .................. 528/30; 556/429; 524/493; 524/496; 524/506
(58) Field of Search ............. 528/30; 556/429; 524/493, 496, 506

(56) References Cited

U.S. PATENT DOCUMENTS 3,346,405 A * 10/1967 Viventi .................. 528/30
4,059,473 A * 11/1977 Okami .................. 556/429

FOREIGN PATENT DOCUMENTS

| DE | 198 25 796 | 12/1999 |
|----|------------|---------|
| EP | 0 652 245 | 5/1995 |

OTHER PUBLICATIONS

Columns 1, 2 and 5–8 of 4,059,473 (Nov. 1977).*

* cited by examiner

Primary Examiner—Margaret G. Moore

(74) Attorney, Agent, or Firm—Smith, Gambrell & Russell, LLP

(57) ABSTRACT

Oligomeric organosilanes useful in rubber mixtures are built up from the two structural units A and B, according to formula I

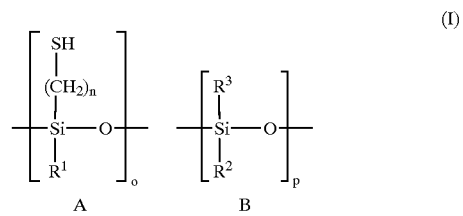

The oligomeric organosilanes are produced by mixing and then co-oligomerizing the monomeric compounds of the structure types I and II

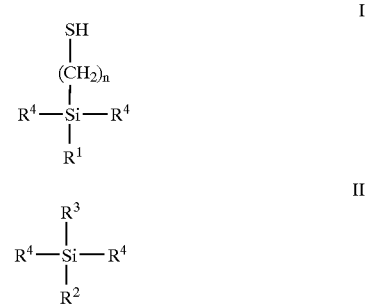

29 Claims, No Drawings

OLIGOMERIC ORGANOSILANES, PROCESS FOR THEIR PRODUCTION AND THEIR USE

INTRODUCTION AND BACKGROUND

The present invention relates to oligomeric organosilanes, a process for their production as well as their use.

It is known to use sulfur-containing organosilicon compounds such as 3-mercaptopropyltrimethoxysilane or bis-(3-[triethoxysilyl]-propyl) tetrasulfane as silane coupling agents or reinforcing additives in oxidically filled rubber mixtures, including inter alia for treads and other parts of automobile tires (DE 2 141 159, DE 2 212 239, U.S. Pat. Nos. 3,978,103, 4,048,206).

Rubber mixtures are known from EP 0 784 072 A1 that are based on at least one elastomer with silica as a filler and a reinforcing additive that is produced by mixing, or as an in situ reaction product, at least one functional polyorganosiloxane compound, and that contain a functional organosilane as a further constituent. As monomeric building blocks there are used in particular 3-mercaptopropyltrialkoxysilanes or bis(trialkoxysilylpropyl) tetrasulfanes that in each case carry 3 or 6 alkoxy substituents.

In the production of rubber mixtures with organosilanes and a filler, for example a precipitated silica, a chemical reaction takes place during a first mixing process, for example in an internal mixer. This chemical reaction involves a condensation between the organosilane and the filler, which is accompanied by a considerable release of alcohol. This eliminated alcohol causes to some extent considerable technical problems during the further processing of the rubber mixtures, such as mixture porosity in the extrusion or undesirable formation of bubbles in the rubber per se. Furthermore a reduction in the release of alcohol during the reaction is desirable for both health and environmental reasons.

It is known that these disadvantages can be largely avoided by the use of oligomeric organosilanepolysulfanes instead of the monomeric sulfur-containing organosilicon compounds that were hitherto used.

Oligomeric organosilanes that are built up from different tructural units A and/or B and/or C

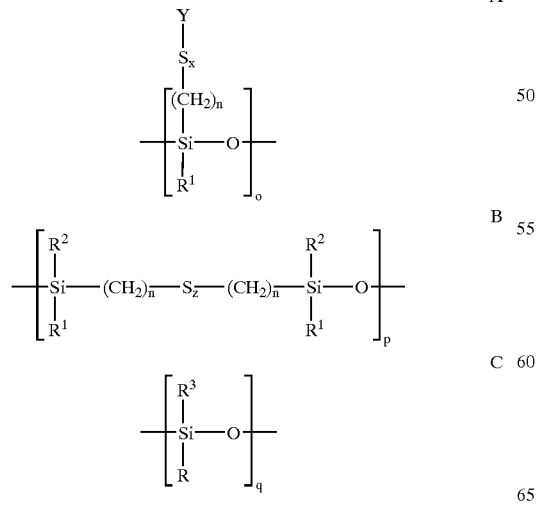

are known from EP 0964021.

A disadvantage of the known oligomeric organosilanes is the poor reinforcing behaviour in rubber mixtures.

An object of the present invention is to produce oligomeric organosilanes that have an improved reinforcing property in rubber mixtures and that on account of the oligomerization lead to a reduced release of ethanol during the mixing process and the subsequent processing steps.

SUMMARY OF THE INVENTION

The above and other objects of the present invention can be achieved by oligomeric organosilanes that are built up from the following 2 structural units A and B according to formula I,

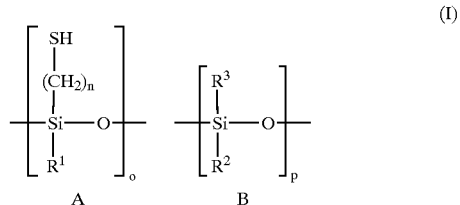

(I)

wherein $R^1$, $R^2$ denote a $(C_1-C_4)$alkoxy group, preferably a methoxy or ethoxy group, $R^3$ denotes a straight-chain or branched $(C_1-C_{20})$alkyl group, preferably a propyl, octyl or hexadecyl group, n is equal to 1–8, preferably 3, and o and p in each case denote a whole positive number from 1–40, where p/o is equal to 0.2/1 to 6/1.

Where $R^3=C_1-C_5$ then p/o may preferably be 2/1 to 5/1, where $R^3=C_6-C_8$ then p/o may preferably be 0.5/1 to 3/1 and where $R^3=C_9-C_{20}$ then p/o may preferably be 0.2/1 to 2/1.

The oligomeric organosilanes may be present as an individual compound with a defined molecular weight as well as an oligomeric mixture with a molecular weight distribution.

The oligomeric organosilanes can have molecular weights of 200 to 16000 g/mole. Preferably the oligomeric organosilanes according to the invention can have molecular weights of 400 to 5000 g/mole.

The invention also relates to a process for the production of the oligomeric organosilanes as described herein, which comprises forming a reaction mixture by mixing together the monomeric compounds of the structure types I and II

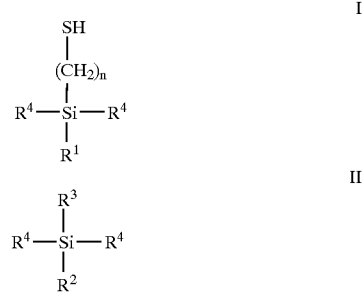

I

II in which $R^1$, $R^2$, $R^3$ and n have the meanings given above and $R^4$ is a $(C_1-C_4)$alkoxy group, preferably a methoxy or ethoxy group, in which $R^4$ may be identical or different, and then co-oligomerizing the reaction mixture.

In this connection organosilicon compounds of arbitrary structure and with variously long sequences of the two structural units may be formed within the scope of the structure types I and II given above.

DETAILED DESCRIPTION OF THE INVENTION

According to the invention, the co-oligomerization reaction may be carried out in a solvent and/or optionally with the aid of a catalyst, at a reaction temperature between 0° C. and 150° C.

As the organosilicon compound of the structural unit I there can be used mercaptopropyltriethoxysilane, mercaptopropyl-trimethoxysilane or mercaptopropyl-methyldiethoxysilane.

As the organosilicon compound of the structural unit II there can be used propyltriethoxysilane, propyltrimethoxysilane, propylmethyldiethoxysilane, dimethyldiethoxysilane, octyltriethoxysilane, octyltrimethoxysilane, hexadecyltriethoxysilane or hexadecyltrimethoxysilane.

The co-oligomerization can be carried out with the addition of water and the release of alcohol in bulk or in an inert organic solvent or mixtures thereof, such as for example in an aromatic solvent such as chlorobenzene, a halogenated hydrocarbon such as chloroform, methylene chloride, an ether such as diisopropyl ether, tert.butyl methyl ether, tetrahydrofuran or diethyl ether, acetonitrile or carboxylic acid esters, for example ethyl acetate, methyl acetate or isopropyl acetate, an alcohol, for example methanol, ethanol, n-propanol, i-propanol, n-butanol, sec. butanol or tert. butanol. Preferred solvents may be ethanol or ethyl acetate.

The reaction according to the present invention may be catalysed. The catalyst can be added in catalytic or stoichiometric amounts. In this connection all types of acidic, basic or neuclophilic catalysts that are known to the person skilled in the art from the SOLGEL chemistry of alkoxysilanes (see for example R. Corriu, D. Leclercq, Angew. Chem. 1996, 108, 1524–1540) are also suitable for the oligomerization within the context of the invention. The catalysts may be present in the same phase as the reaction solution (homogeneous catalysis) or may be present as solids (heterogeneous catalysis) and are separated after the end of the reaction.

An acidic, basic or nucleophilic catalyst can be used in the catalysis.

The basic catalysis can be carried out for example with an organic base such as triethylamine, tetramethylpiperidine, tributylamine or pyridine, or with an inorganic base such as NaOH, KOH, Ca(OH)$_2$, Na$_2$CO$_3$, K$_2$CO$_3$, CaCO$_3$, CaO, NaHCO$_3$, KHCO$_3$, or alcoholates such as NaOCH$_3$ or NaOC$_2$H$_5$.

Nucleophilic catalysis can be performed with aluminum oxide or suitable fluorides, for example ammonium fluoride, sodium fluoride, potassium fluoride, or arbitrary tetraalkylammonium fluorides such as tetrabutylammonium fluoride.

Acid catalysis can be carried out with dilute aqueous mineral acids or solutions of Lewis acids in water. Tetrabutyl orthotitanate can for example be used as Lewis acid.

The catalysis is preferably carried out with dilute aqueous NaOH or a solution of ammonium fluoride in water, 1 mole % of catalyst being employed with reference to the amount of water used.

Suitable amounts of methanol can be added for the catalysis.

The reaction conditions, in particular the amount of water added, can be chosen so that the reaction products do not polycondense to form a solid.

After completion of the reaction the readily volatile constituents can be removed and the catalyst can be deactivated in a conventional manner or removed.

The present invention also relates to rubber mixtures which comprise rubber, fillers such as for example precipitated silica, optionally further rubber auxiliary substances, as well as at least one oligomeric organosilane according to the invention.

The oligomeric organosilane according to the invention can be used in amounts of from 0.1 to 15 wt. %, referred to the amount of the rubber used.

The addition of the oligomeric organosilanes according to the invention as well as the addition of the fillers can preferably take place at melt temperatures of 100° to 200° C. The addition can however also take place subsequently at lower temperatures (40° to 100° C.) for example together with further rubber auxiliary substances.

The oligomeric organosilanes can be added to the mixing process in pure form as well as applied to an inert organic or inorganic carrier. Preferred carrier materials are silicas, natural or synthetic silicates, aluminum oxide or carbon blacks.

As fillers the following substances can be used for the rubber mixtures according to the invention:

Carbon blacks: the carbon blacks used in this connection are produced by the flame black, furnace black or gas black process and have BET surface area of 20 to 200 m$^2$/g, such as for example SAF, ISAF, HSAF, HAF, FEF or GPF carbon blacks. The carbon blacks can optionally also contain heteroatoms such as e.g. Si.

Highly dispersed silicas, produced for example by precipitating solutions of silicates or flame hydrolysis of silicon halides with specific surfaces of 5 to 1000 m$^2$/g, preferably 20 to 400 m$^2$/g (BET surface area) and with primary particle sizes of 10 to 400 nm. The silicas can optionally also be present as mixed oxides with other metal oxides such as Al, Mg, Ca, Ba, Zn and titanium oxides.

Synthetic silicates such as aluminum silicate, alkaline earth silicates such as magnesium silicate or calcium silicate, with BET surfaces of 20 m$^2$/g to 400 m$^2$/g and primary particle diameters of 10 to 400 nm.

Natural silicates such as kaolin and other naturally occurring silicas.

Glass fibers and glass fiber products (mats, strands) or microsize glass spheres.

There can preferably be used carbon blacks with BET surface areas of 20 m$^2$/g to 400 m$^2$/g or highly dispersed silicas produced by precipitation of solutions of silicates, with BET surface areas of 20 m$^2$/g to 400 m$^2$/g, in amounts of 5 to 150 parts by weight, in each case referred to 100 parts of rubber.

The aforementioned fillers can be used alone or as a mixture. In a particularly preferred embodiment of the process, for the production of the mixtures there can be used 10 to 150 parts by weight of light fillers, optionally together with 0 to 100 parts by weight of carbon black, as well as 0.3 to 10 parts by weight of a compound of the oligomeric organosilanes according to the invention, in each case referred to 100 parts by weight of rubber.

In addition to natural rubber, synthetic rubbers are also suitable for the production of the rubber mixtures according to the invention. Preferred synthetic rubbers are described for example in W. Hofmann, Kautschuktechnologie, Genter Verlag, Stuttgart 1980. Such rubbers include, inter alia, polybutadiene (BR)

polyisoprene (IR)

styrene/butadiene copolymers with styrene contents of 1 to 60 wt. %, preferably 2 to 50 wt. % (SBR)

isobutylene/isoprene copolymers (IIR)

butadiene/acrylonitrile copolymers with acrylonitrile contents of 5 to 60 wt. %, preferably 10 to 50 wt. % (NBR)

partially hydrogenated or fully hydrogenated NBR rubber (HNBR)

ethylene/propylene/diene copolymers (EPDM)

as well as mixtures of these rubbers. Anionically polymerized L-SBR rubbers with a glass transition temperature above −50° C. as well as their mixtures with diene rubbers are particularly suitable for the production of automobile tires.

The rubber vulcanisates according to the invention may contain further rubber auxiliary substances such as reaction accelerators, anti-ageing agents, heat stabilizers, light stabilizers, anti-ozonants, processing auxiliary substances, plasticizers, tackifiers, blowing agents, dyes, pigments, waxes, extending agents, organic acids, inhibitors, metal oxides as well as activators such as triethanolamine, polyethylene glycol, hexanetriol, that are known in the rubber industry.

The rubber auxiliary substances can be used in known amounts that are governed by, inter alia, the intended use. Conventional amounts are for example amounts of 0.1 to 50 wt. % referred to the rubber. Sulfur or sulfur-donating substances can be used as crosslinking agents. The rubber mixtures according to the invention can furthermore contain vulcanization accelerators. Examples of suitable vulcanization accelerators are mercaptobenzothiazoles, sulfenamides, guanidines, thiurams, dithiocarbamates, thioureas and thiocarbonates. The vulcanization accelerators and sulfur are used in amounts of 0.1 to 10 wt. %, preferably 0.1 to 5 wt. %, referred to the rubber.

The vulcanization of the rubber mixtures according to the invention can take place at temperatures of 100° to 200° C., preferably 130° to 180° C., optionally under a pressure of 10 to 200 bar. The mixing of the rubbers with the filler, optionally rubber auxiliary substances and the oligomeric silanes (I) according to the invention can be carried out in known mixing equipment such as rollers, internal mixers and mixer-extruders.

The rubber mixtures according to the invention are suitable for the production of moulded articles, for example for the production of pneumatic tires, tire treads, cable sheathing, hoses, drive belts, conveyor belts, roller coatings, tires, shoe soles, sealing rings and damping elements.

The oligomeric organosilanes according to the invention exhibit the advantages of a low rolling resistance (correlated with tan δ 60° C.), improved abrasion resistance, improved scorch behaviour and higher reinforcing factor (M300/M100).

EXAMPLES

Production of the Oligomeric Organosilane Polysulfanes

Example 1

92.0 g (0.38 mole) of 3-mercaptopropyltriethoxysilane (MPTES, Dynasylan 3201, Degussa AG), 412.0 g (2 moles) of propyltriethoxysilane (PTES, VP Si203, Degussa AG), 51.8 g of water, 132.0 g of ethanol, 5.0 g of methanol and 0.2 g of hydrochloric acid (37%) are mixed in a 1 l capacity round-bottomed flask while stirring. The solvent is then removed in vacuo in a rotary evaporator. The readily volatile constituents are removed in vacuo during the subsequent drying. A product with a sulfur content of 3.94% is obtained.

Comparison Example 1 According to EP 0964021

133 g (0.25 mole) of bis-(3-[triethoxysilyl]-propyl) tetrasulfane (TESPT, Si69, Degussa AG) and 44.0 g (0.21 mole) of propyltriethoxysilane (PTES) together with 1 ml of tetrabutyl orthotitanate are placed in a 500 ml round-bottomed flask while stirring at 80° C. 8.50 g (0.47 mole) of $H_2O$ are then taken up in 10 ml of ethanol (analysis purity) and slowly added while stirring. After the end of the addition the reaction mixture is stirred for 1 hour at 80° C., following which the ethanol is distilled off at 80° C. and 500–300 mbar. The remaining volatile constituents are then removed at 80° C./30 mbar. An oily product containing 1.85 ethoxy groups per Si unit (determined according to $^1$H-NMR) and an annealing residue of 28.8% is obtained.

Comparison Example 2 According to EP 0964021

The production is carried out similarly to comparison example 1 except that, instead of PTES, in this case 31.0 g (0.21 mole) of dimethyldiethoxysilane (DMDES, Gelest) are used. The oily product obtained has according to $^1$H-NMR analysis 1.60 ethoxy groups per Si unit. The annealing residue is 30.3%.

Example 2

A mixture of 120.0 g (0.50 mole) of 3-mercaptopropyltriethoxysilane (MPTES) and 225.0 g (1.09 moles) of propyltriethoxysilane (PTES) is placed in a 1 liter capacity four-necked flask equipped with stirrer. A solution consisting of 17.2 g of water, 5.0 g of methanol and 0.4 g of conc. hydrochloric acid in 100 ml of ethanol is added within one hour. After heating under reflux for two hours the solvent and all volatile constituents are removed at 110° C. under a high vacuum. 250.5 g of a viscous liquid is obtained.

The product has a sulfur content of 6.8% and an annealing residue of 36.4%.

Example 3

A mixture of 120.0 g (0.50 mole) of 3-mercaptopropyltriethoxysilane (MPTES) and 125.0 g (0.45 mole) of octyltriethoxysilane (OTES, VP Si208, Degussa AG) is placed in a 1 liter capacity four-necked flask equipped with stirrer. A solution consisting of 5.3 g of water, 5.0 g of methanol and 1.5 g of conc. hydrochloric acid in 60 ml of ethanol is added dropwise within one hour. After heating under reflux for 4.5 hours the solvent and all volatile constituents are removed under a high vacuum at 110° C. 197.1 g of a viscous liquid are obtained.

The product has a sulfur content of 7.5% and an annealing residue of 27.1%.

Example 4

A mixture of 120.0 g (0.50 mole) of 3-mercaptopropyltriethoxysilane (MPTES) and 80.0 g (0.20 mole) of hexadecyltriethoxysilane (HDTES, VP Si216, Degussa AG) is placed in a 1 liter capacity four-necked flask equipped with stirrer. A solution consisting of 4.0 g of water, 5.0 g of methanol and 0.37 g of conc. hydrochloric acid in 45 ml of ethanol is added dropwise within one hour. After heating for 4 hours under reflux the solvent and all volatile constituents are removed under a high vacuum at 120° C. 156.0 g of a viscous liquid are obtained.

The product has a sulfur content of 8.7% and an annealing residue of 22.8%.

Production of the Rubber Mixtures and Vulcanisates

Example 5

In Example 5 a mixture is produced with the oligomeric organosilane according to the invention of Example 1 with the in situ mixtures of Si 69, Si 263/Si 203 and the comparison silanes according to EP 0964021 (comparison examples 1 and 2).

The formulation used for the rubber mixtures 1 to 5 is given in Table 1. In this connection the unit "phr" denotes proportions by weight referred to 100 parts of the raw rubber that is used. In the case of the mixtures 2 and 5 with 3-mercaptopropyltriethoxysilane (MPTES) and with the oligomeric organosilane according to the invention the sulfur content must be increased from 1.5 to 2.2 in order to take account of the polysulfidic sulfur contained in Si 69. The general process for the production of rubber mixtures and their vulcanisates is described in the following book: "Rubber Technology Handbook", W. Hofmann, Hanser Verlag 1994.

TABLE 1

| Substance | Mixture 1 | Mixture 2 | Mixture 3 | Mixture 4 | Mixture 5 |
|---|---|---|---|---|---|
| | Amount [phr] | | | | |
| 1st stage | | | | | |
| Buna VSL 5025-1 | 96.0 | 96.0 | 96.0 | 96.0 | 96.0 |
| Buna CB 24 | 30.0 | 30.0 | 30.0 | 30.0 | 30.0 |
| Ultrasil 7000 GR | 80.0 | 80.0 | 80.0 | 80.0 | 80.0 |
| ZnO | 3.0 | 3.0 | 3.0 | 3.0 | 3.0 |
| Stearic acid | 2.0 | 2.0 | 2.0 | 2.0 | 2.0 |
| Vulkanox 4020 | 1.5 | 1.5 | 1.5 | 1.5 | 1.5 |
| Protector G35P | 1.0 | 1.0 | 1.0 | 1.0 | 1.0 |
| Si69 | 6.4 | — | — | — | — |
| Dynasylan 3201 | — | 5 | — | — | — |
| VP Si203 | — | 1 | — | — | — |
| Comparison ex. 1 according to EP 0964021 | — | — | 6.4 | — | — |
| Comparison ex. 2 according to EP 0964021 | — | — | — | 6.4 | — |
| Example 1 | — | — | — | — | 6.4 |
| 2nd stage | | | | | |
| Batch stage 1 | | | | | |
| 3rd stage | | | | | |
| Batch stage 2 | | | | | |
| Vulkacit D | 2.0 | 2.0 | 2.0 | 2.0 | 2.0 |
| TBzTD | 0.2 | 0.2 | — | — | 0.2 |
| Vulkacit Cz | 1.5 | 1.5 | 1.5 | 1.5 | 1.5 |
| Sulfur | 1.5 | 2.2 | 1.5 | 1.5 | 2.2 |

The polymer VSL 5025-1 is an SBR copolymer polymerized in solution from Bayer AG with a styrene content of 25 wt. % and a butadiene content of 75 wt. %. 73% of the butadiene is 1,2-coupled, 10% is cis-1,4-coupled and 17% is trans-1,4-coupled. The copolymer contains 37.5 phr oil and has a Mooney viscosity (ML 1+4/100° C.) of about 50.

The polymer Buna CB 24 is a cis-1.4-polybutadiene from Bayer AG with a cis-1,4 content of >96%, a 1,2 content of <2% and a Mooney viscosity of 44±5.

The silica Ultrasil 7000 GR from Degussa-Hüls AG has a BET surface of 175 m²/g.

Si69 is (bis-(3-[triethoxysilyl]-propyl)tetrasulfane),

VP Si203 is propyltriethoxysilane and Dynasylan 3201 is 3-mercaptopropyltriethoxysilane from Degussa AG.

Naftolen ZD from Chemetall is used as aromatic oil; Vulkanox 4020 is a PPD from Bayer AG and Protektor G35P is an anti-ozonant wax from HB-Fuller GmbH. Vulkacit D (DPG) and Vulkacit CZ (CBS) are commercial products from Bayer AG. TBzTD is a commercial product from Flexis S. A.

The rubber mixtures are produced in an internal mixer corresponding to the mixing protocol in Table 2.

TABLE 2

| Stage 1 | |
|---|---|
| Settings | |
| Mixing unit | Werner & Pfleiderer E-Type |
| Rotat. speed | 70 min$^{-1}$ |
| Ram pressure | 5.5 bar |

TABLE 2-continued

| | |
|---|---|
| Empty volume | 1.58 L |
| Filling degree | 0.56 |
| Thro'flow temp | 70° C. |
| Mixing procedure | |
| 0 to 1 min | Buna VSL 5025-1 + Buna CB 24 |
| 1 to 3 min | 1/2 silicic acid, ZnO, stearic acid, Naftolen ZD, silanes |
| 3 to 4 min | 1/2 salicic acid, Vulkonox 4020, Protektor G35P |
| 4 min | Cleaning |
| 4 to 5 min | Mixing |
| 5 min | Cleaning |
| 5 to 6 min | Mixing and discharge |
| Batch temp. | 145–150° C. |
| Storage | 24 hours at room temperature |
| Stage 2 | |
| Settings | |
| Mixing unit | As in stage 1 up to: |
| Rotat. speed | 80 min$^{-1}$ |
| Throughflow temperature | 80° C. |
| Filling degree | 0.53 |
| Mixing procedure | |
| 0 to 2 min | Break up batch stage 1 |
| 2 to 5 min | Batch temperature of 150° C. by maintaining the rotational speed variation |
| 5 min | Discharge |

TABLE 2-continued

| | |
|---|---|
| Batch temp. | 140–145° C. |
| Storage | 4 hours at room temperature |

| Settings | |
|---|---|
| Mixing unit | As in stage 1 up to |
| Rotat. speed | 40 min$^{-1}$ |
| Filling degree | 0.51 |
| Throughflow temperature | 50° C. |

| Mixing procedure | |
|---|---|
| 0 to 2 min | Batch stage 2, accelerator, sulfur |
| 2 min | Discharge and sheeting out on laboratory mixing roller (Diameter 200 mm, length 450 mm, Throughflow temperature 50° C.) Homogenisation: cut 3x left-hand side, 3x right-hand side and fold, as well as break up 8x with narrow roller gap (1 mm) and 3x with wide roller gap (3.5 mm) remove sheet. |

The vulcanization time for the testpieces is 60 minutes at 165° C.

The rubber technology testing is carried out according to the test methods given in Table 3.

TABLE 3

| Physical Testing | Norm/Conditions |
|---|---|
| ML 1 + 4, 100° C. | DIN 53523/3, ISO 667 |
| Vulcameter testing, 165° C. | DIN 53529/3, ISO 6502 |
| Tensile tests on the ring, 23° C. | DIN 53504, ISO 37 |
|    Tensile strength | |
|    Modulus values | |
|    Elongation at break | |
| Shore A hardness, 23° C. | DIN 53 505 |
| Ball rebound, 0° and 60° C. | ASTM D 5308 |
| Viscoelast. properties, 0° and 60° C. | DIN 53 513, ISO 2856 |
|    E* | |
|    tan | |
| DIN abrasion, 10 N force | DIN 53 516 |
| Dispersion | ISO/DIS 11345 |

Production of the rubber mixtures and vulcanizates

The results for the raw mixtures and vulcanizates are contained in Table 4.

The mixture with the oligomeric organosilane according to the invention (Mixture 5) has a significantly higher reinforcing factor (modules 300%/100%) than the mixture with the organosilanepolysulfanes, produced according to EP 0964021 (Example 3/4), and the Si69 reference (Mixture 1).

Furthermore the mixture with the oligomeric organosilane according to the invention (Mixture 5) has the highest tan δ 0° C. value (improved wet skidding resistance) and the lowest δ 60° C. value (improved rolling resistance).

Mixture 2 can be processed only with difficulty on account of the extremely short t 10% time and is therefore not suitable in practice.

Example 6

Example 6 compares the oligomeric organosilanes according to the invention of Examples 2 to 4 with a corresponding Si 69 in situ reference mixture. The formulation employed corresponds to that in Table 1 (Mixture 3), the silanes corresponding to Table 5 being added. The amount of oligomeric organosilane should be chosen so that the number of silicon units in the Mixtures 7 to 9 is identical. The sulfur content for the reference mixture is 1.5 phr, and that for the Mixtures 7 to 9 with the oligomeric organosilanes is 2.3 phr.

The rubber mixtures are produced as per Table 2 and the test specimens are vulcanized at 165° C.

The vulcanization time for the reference Mixture 6 is 25 minutes, and that for the Mixtures 7 to 9 is in each case 20 minutes.

The rubber technology testing is carried out according to the test methods given in Table 3.

The results for the raw mixtures and vulcanizates are contained in Table 5.

TABLE 4

| Feature: | Unit | Mixture 1 | Mixture 2 | Mixture 3 | Mixture 4 | Mixture 5 |
|---|---|---|---|---|---|---|
| Raw Mixture Results | | | | | | |
| ML (1 + 4) at 100° C. | [ME] | 58 | 80 | 65 | 66 | 60 |
| Mooney scorch 130° C., t5 | [min] | 26.9 | 2.1 | — | — | 27.5 |
| Dmax-Dmin (MDR, 165° C.) | [dNm] | 15.7 | 10.8 | 18.9 | 18.2 | 14.5 |
| t 10% (MDR, 165° C.) | [min] | 1.3 | 0.3 | 1.9 | 1.9 | 2.0 |
| t 90% (MDR, 165° C.) | [min] | 7.6 | 4.4 | 24.3 | 25.4 | 4.9 |
| Vulcanisate Results | | | | | | |
| Tensile Strength | [MPa] | 14.0 | 12.6 | 14.1 | 15.6 | 14.4 |
| Modulus 100% | [MPa] | 1.4 | 1.6 | 2.7 | 2.6 | 1.8 |
| Modulus 300% | [MPa] | 6.6 | 10.1 | 12.5 | 11.7 | 10.1 |
| Modulus 300%/100% | [—] | 4.7 | 6.2 | 4.6 | 4.5 | 5.8 |
| Elongation at break | [%] | 460 | 340 | 330 | 360 | 380 |
| Shore A hardness | [SH] | 61 | 57 | 66 | 66 | 59 |
| Ball rebound (0° C.) | [%] | 12.5 | 10.0 | 10.1 | 10.5 | 8.7 |
| Ball rebound (60° C.) | [%] | 57.4 | 68.0 | 63.2 | 63.0 | 66.2 |
| Loss factor, tan δ (0° C.) | [—] | 0.468 | 0.435 | 0.496 | 0.500 | 0.507 |
| Loss factor, tan δ (60° C.) | [—] | 0.147 | 0.107 | 0.105 | 0.111 | 0.098 |

TABLE 5

|  |  | Mixture 6 | Mixture 7 | Mixture 8 | Mixture 9 |
|---|---|---|---|---|---|
| Si 69 | [phr] | 6.4 | — | — | — |
| Example 2 | [phr] | — | 5.2 | — | — |
| Example 3 | [phr] | — | — | 4.2 | — |
| Example 4 | [phr] | — | — | — | 3.0 |
| Raw Mixture Results |  |  |  |  |  |
| ML (1 + 4) | [ME] | 59 | 60 | 59 | 57 |
| Dmax-Dmin | [dNm] | 15.3 | 12.4 | 12.1 | 12.6 |
| t 10% | [min] | 1.7 | 1.2 | 1.1 | 1.3 |
| t 90% | [min] | 11.4 | 7.3 | 12.2 | 18.5 |
| Vulcanizate Results |  |  |  |  |  |
| Tensile strength | [MPa] | 16.0 | 13.1 | 13.1 | 15.1 |
| Modulus 100% | [MPa] | 1.8 | 1.8 | 1.6 | 1.4 |
| Modulus 300% | [MPa] | 9.7 | 12.4 | 11.2 | 9.2 |
| Modulus 300%/100% | [MPa] | 5.3 | 6.9 | 7.0 | 6.6 |
| Elongation at break | [%] | 410 | 310 | 330 | 400 |
| Shore A hardness | [SH] | 61 | 57 | 55 | 55 |
| Ball rebound, 60° C. | [%] | 62.9 | 69.2 | 68.9 | 67.8 |
| DIN abrasion | [mm³] | 80 | 61 | 63 | 69 |
| Dyn. Mod. Elast. E*, 0° C. | [MPa] | 12.7 | 11.3 | 10.8 | 11.1 |
| Dyn. Mod. Elast. E*, 60° C. | [MPa] | 6.4 | 6.1 | 5.8 | 5.7 |
| Loss factor tan δ, 0° C. | [—] | 0.452 | 0.44 | 0.446 | 0.445 |
| Loss factor tan δ, 60° C. | [—] | 0.122 | 0.088 | 0.092 | 0.105 |
| Phillips dispersion | [—] | 8 | 8 | 8 | 8 |

As can be seen from the data given in Table 5, the oligomeric organosilanes according to the invention exhibit an increased reinforcement ratio/modulus value 300%/100%, a reduced DIN abrasion, and a lower hysteresis loss tan δ, which correlates with the rolling resistance.

Further variations and modifications will be apparent to those skilled in the art from the foregoing and are intended to be encompassed by the claims appended hereto.

German priority application 101 32 941.5 of Jul. 6, 2001 is relied on and incorporated herein by reference.

We claim:

1. An oligomeric organosilane built up from the two structural units A and B, represented by formula

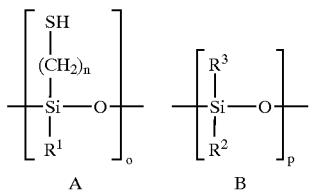

wherein $R^1$, $R^2$ denotes $(C_1–C_4)$Alkoxy, $R^3$ denotes straight-chain or branched $(C_1–C_5)$alkyl, n is equal to 1–8, and o and p in each case denote a whole positive number from 1 to 40, where p/o is equal to 2/1 to 5/1.

2. An oligomeric organosilane built up from the two structural units A and B, represented by formula

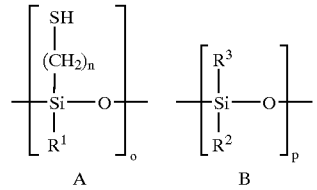

wherein $R^1$, $R^2$ denotes $(C_1–C_4)$Alkoxy, $R^3$ denotes straight-chain or branched $(C_6–C_8)$alkyl, n is equal to 1–8, and o and p in each case denote a whole positive number from 1 to 40, where p/o is equal to 0.5/1 to 3/1.

3. An oligomeric organosilane built up from the two structural units A and B, represented by formula

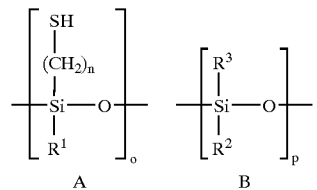

wherein $R^1$, $R^2$ denotes $(C_1–C_4)$Alkoxy, $R^3$ denotes straight-chain or branched $(C_9–C_{20})$alkyl, n is equal to 1–8, and o and p in each case denote a whole positive number from 1 to 40, where p/o is equal to 0.2/1 to 2/1.

4. The oligomeric organosilane according to claim 1, wherein the molecular weight is 400 to 5000 g/mole.

5. The oligomeric organosilane according to claim 2, wherein the molecular weight is 400 to 5000 g/mole.

6. The oligomeric organosilane according to claim 3, wherein the molecular weight is 400 to 5000 g/mole.

7. A process for the production of an oligomeric organosilane built up from the two structural units A and B, represented by formula

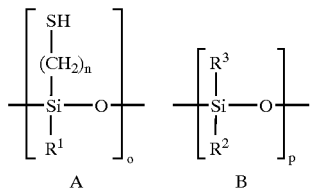

wherein $R^1$, $R^2$ denotes $(C_1-C_4)$Alkoxy,
$R^3$ denotes straight-chain or branched $(C_1-C_{20})$alkyl,
n is equal to 1–8, and
o and p in each case denote a whole positive number from 1 to 40,
where p/o is equal to 0.2/1 to 6/1
comprising mixing together the monomeric compounds represented by the structure I and II

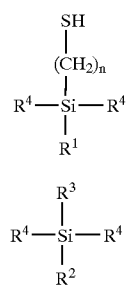

in which $R^1$, $R^2$, $R^3$ and n have the meanings given above and $R^4$ is a $(C_1-C_4)$alkoxy group, in which $R^4$ may be identical or different,
and then co-oligomerizing said compounds.

8. The process according to claim 7, wherein mercaptopropyl-triethoxysilane is used as the compound of the structure I.

9. The process according to claim 7, wherein propyltriethoxysilane is used as the compound of the structure type II.

10. The process according to claim 7, wherein the co-oligomerization reaction is carried out in a solvent and/or optionally with the aid of a catalyst, at reaction temperature between 0° C. and 150° C.

11. The process according to claim 7, wherein the organosilicon compound of the structural unit I is mercaptopropyltriethoxysilane or mercaptopropyltrimethoxysilane.

12. The process according to claim 7, wherein the organosilicon compound of the structural unit II is propyltriethoxysilane, propyltrimethoxysilane, octyltriethoxysilane, octyltrimethoxysilane, hexadecyltriethoxysilane or hexadecyltrimethoxysilane.

13. The process according to claim 7 further comprising carrying out the co-oligomerization with the addition of water and the release of alcohol in bulk or in an inert organic solvent or mixtures thereof.

14. The process according to claim 10, wherein an acidic, basic or nucleophilic catalyst is present.

15. The process according to claim 14, wherein the basic catalyst is triethylamine, tetramethylpiperidine, tributylamine or pyridine, or NaOH, KOH, Ca(OH)$_2$, Na$_2$CO$_3$, K$_2$CO$_3$, CaCO$_3$, CaO, NaHCO$_3$, KHCO$_3$, NaOCH$_3$ or NaOC$_2$H$_5$.

16. The process according to claim 14, wherein a nucleophilic catalysis is performed with aluminum oxide or a fluoride.

17. The process according to claim 14, wherein acid catalysis is carried out with dilute aqueous mineral acids or solutions of Lewis acids in water.

18. The process according to claim 10, wherein catalysis is carried out with dilute aqueous NaOH or a solution of ammonium fluoride in water, with 1 mole % of catalyst being employed with reference to the amount of water used.

19. The process according to claim 7, wherein reaction conditions, in particular the amount of water added, are chosen so that the reaction products do not polycondense to form a solid.

20. A rubber composition comprising rubber, filler, and at least one oligomeric organosilane built up from the two structural units A and B, represented by formula

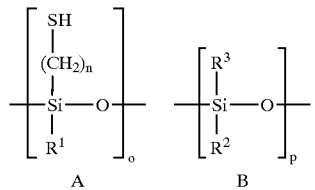

wherein $R^1$, $R^2$ denotes $(C_1-C_4)$Alkoxy,
$R^3$ denotes straight-chain or branched $(C_1-C_{20})$alkyl,
n is equal to 1–8, and
o and p in each case denote a whole positive number from 1 to 40,
where p/o is equal to 0.2/1 to 6/1.

21. The rubber composition of claim 20, wherein the amount of oligomeric organosilane is 0.1 to 15 wt. % based on the amount of rubber.

22. The rubber composition of claim 20, wherein the filler is a member selected from the group consisting of carbon black, silicas, synthetic silicates, natural silicates, glass fiber and mixtures thereof.

23. The rubber composition according to claim 22, wherein the filler is carbon black having a BET surface area of 20 m²/g to 400 m²/g or precipitated silica with a BET surface area of 20 m²/g to 400 m²/g.

24. The rubber composition according to claim 20, wherein the rubber is a member selected from the group consisting of polybutadiene, polyisoprene, styrene/butadiene copolymers with styrene content of 1 to 60 wt. %, isobutylene/isoprene copolymers, butadiene/acrylonitrile copolymers with acrylonitrile contents of 5 to 60 wt. %, partially hydrogenated or fully hydrogenated NBR rubber, ethylene/propylene/diene copolymers and mixtures thereof.

25. Process for the production of rubber mixtures comprising mixing together a rubber, at least one filler, and an oligomeric organosilane built up from the two structural units A and B, represented by formula

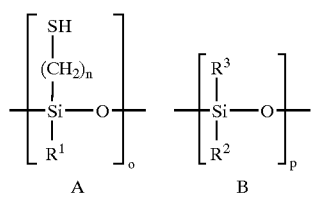

wherein $R^1$, $R^2$ denotes $(C_1-C_4)$Alkoxy,
$R^3$ denotes straight-chain or branched $(C_1-C_{20})$alkyl,
n is equal to 1–8, and o and p in each case denote a whole positive number from 1 to 40, where p/o is equal to 0.2/1 to 6/1.

26. A moulded article obtained from the rubber mixture comprising rubber, filler and at least one oligomeric organosilane according to claim 1.

27. A vulcanized tire made from the rubber mixture prepared by the process of claim 25.

28. A moulded article obtained from the rubber mixture comprising rubber, filler and at least one oligomeric organosilane according to claim 2.

29. A moulded article obtained from the rubber mixture comprising rubber, filler and at least one oligomeric organosilane according to claim 3.

* * * * *